May 24, 1960 D. F. MASON ET AL 2,937,527
APPARATUS FOR DETERMINING THE PRODUCTION POTENTIAL OF WELLS
Filed April 9, 1956 2 Sheets-Sheet 1
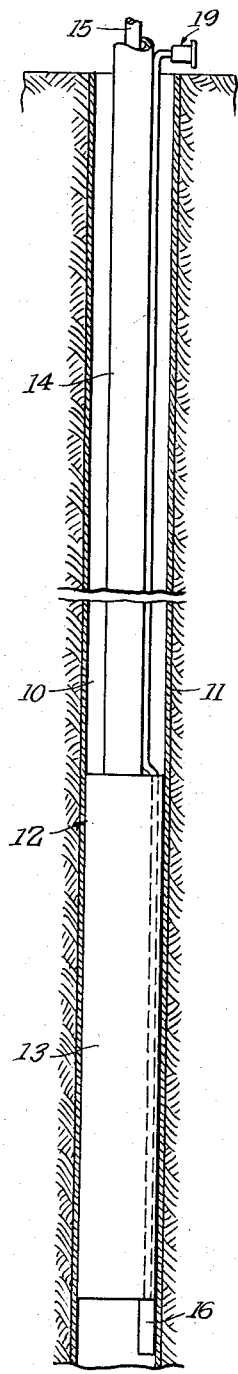
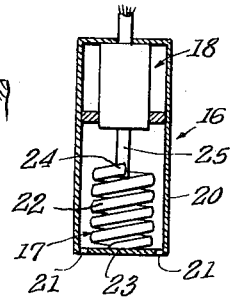
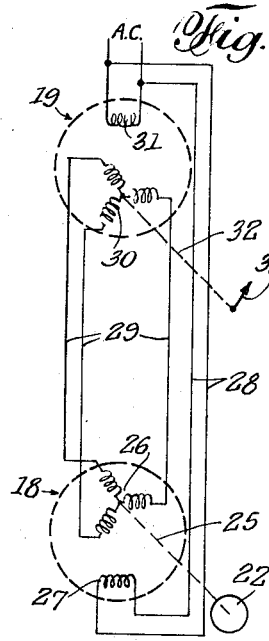
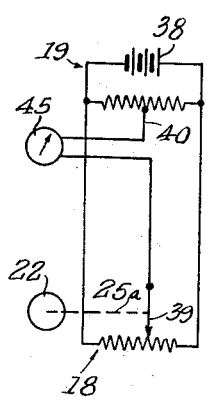
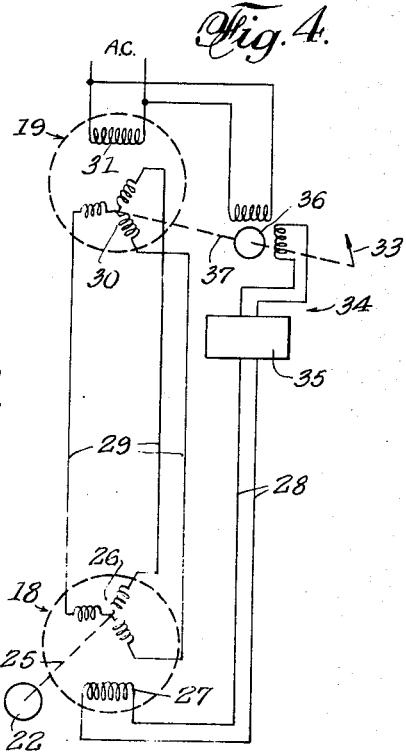
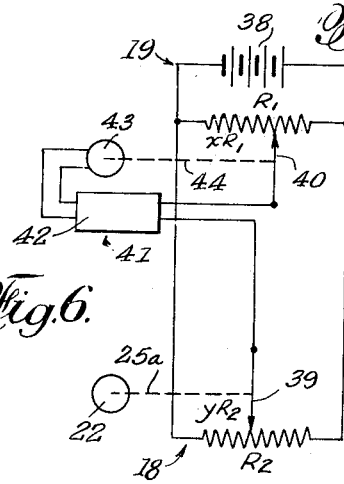
INVENTORS
DONALD F. MASON
GEORGE THODOS
BY LEROY F. STUTZMAN
C. G. Stratton
ATTORNEY

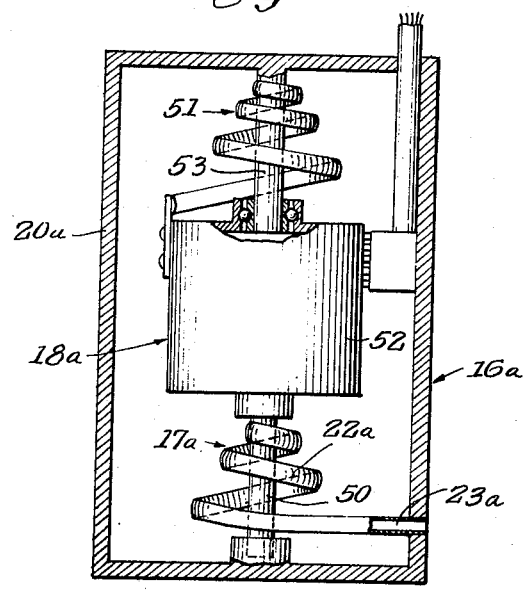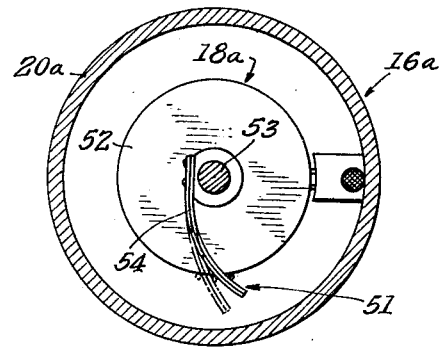

United States Patent Office 2,937,527
Patented May 24, 1960

2,937,527

APPARATUS FOR DETERMINING THE PRODUCTION POTENTIAL OF WELLS

Donald F. Mason, George Thodos, and Leroy F. Stutzman, all of Evanston, Ill., assignors to Strike Investment Company, Salt Lake City, Utah, a corporation of Utah Filed Apr. 9, 1956, Ser. No. 577,163

4 Claims. (Cl. 73—393)

This invention relates to apparatus for measuring physical properties and transmitting the resulting information over long distances, and more particularly to measuring and transmitting the physical properties present in wells to, thereby, determine the production rates, compositions, and useful life of such wells.

It is important in reservoir engineering that the static and flowing pressures, temperatures and other physical properties that are present in an oil or gas well be known in order to enable the prediction of production rates, composition of the fluids, and life of the reservoir.

The ideal production rates of different wells vary. Thus, in order to operate a well with greatest economy and maximum production efficiency resulting therefrom, it is essential to learn its pressure, temperature, and other physical properties and use these to calculate the best procedure or method of production. In such manner it may be determined whether the production would be improved by water and/or gas injection or other artificial steps taken to obtain maximum production at optimum rates.

Prior attempts have been made to determine the properties of wells, but, due to great well depth and other volumetric limitations, such as bore diameter, and the desirability or necessity for continuous production during such determination, prior devices have not fulfilled nor realized their expectations. Sporadically, and much too infrequently during the life of a well, the reservoir properties thereof have been determined in the past and only by stopping well production, permitting the reservoir fluids to achieve a state of static equilibrium and pulling or withdrawing the string. Then, by measuring the height of the fluids in the well casing, the data obtained would be used to calculate the reservoir's properties. The high cost and inefficiency of this prior method are clearly evident and are the primary reasons for the sporadic determination of the well properties with the resultant lack of data before the reservoir engineers for proper analysis of the well and the best recommendations regarding production procedure.

Recognizing the foregoing faults of prior means and/or methods, it is an object of the present invention to provide relatively inexpensive equipment of such small size as to be capable of introduction into a well without affecting or otherwise interfering with production, and adapted to continuously and accurately measure reservoir pressures, temperatures, and/or other propeties of a well under both flowing and static conditions.

Another object of the invention is to provide apparatus of the character referred to that utilizes electrical transmission of mechanical motion produced in the well, the motion being produced by physical properties of the well, such as pressure and temperature.

A further object of the invention is to provide apparatus of the type above indicated that translates the motion produced into electrical energy, such energy being transmitted to the well surface where the same may be read, recorded, or otherwise determined.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Fig. 1 is a semi-diagrammatic view of a typical well that is in production and provided with the means of the present invention.

Fig. 2 is an enlarged vertical sectional view of a transducer as used in such means.

Fig. 3 is a diagrammatic view of one form of transmitting system that translates and transmits electrical energy as provided by the transducer.

Fig. 4 is a similar view of a transmitting system that is modified to include amplification of the electrical signal that is involved.

Figs. 5 and 6 are diagrammatic views of further modifications.

Fig. 7 is an enlarged view similar to Fig. 2, of a modified form of transducer.

Fig. 8 is a plan sectional view of still another form of transducer.

Fig. 1 shows a well 10 that may typically be lined with a casing 11, the well being provided with conventional means 12 that produces a flow of fluid from the lower end of the well upward toward the surface. In this instance, the means 12 is shown as a pump 13 that is retained in position in the well by a string 14, and a reciprocative string of rods 15 operative within the string 14.

The foregoing is generally typical and is merely indicative of a producing mechanism that may be lowered in the well and be in continuous operation.

According to the present invention, the means 12 may carry a unit 16 in which is provided a device 17 mechanically responsive to a property of the well and a generator means 18 that electrically responds to the device 17. Said means is preferably in the form of a Selsyn motor. The present means further includes a motor means 19 that automatically adjusts itself to the position of response of the generator means.

The unit 16 may include a housing 20 that is open, as by apertures 21, to the pressure, temperature and other property conditions of the well 10 and the same is preferably placed at or near where the production flow originates.

The device 17 may vary according to the well property to which it responds. In this instance, the same is shown in Fig. 2 as a helically coiled Bourdon tube 22 formed of a non-corrosive material and, the same being filled with some inert gas of known properties of expansion. One end of said tube 22 is anchored, as at 23 and the other end 24 is, accordingly, free to move in a circular path as the tube spirally unwinds or winds up in response to changes in pressure within housing 20 and resulting from the differences in the expansion and contraction of the atmospheres in said housing and within the tube. The generator 18 includes an actuator shaft or the like 25 and the mentioned end 24 of the Bourdon tube is connected thereto to rock or rotate said shaft. It will be clear, then, that said shaft will assume a rotational position corresponding to the pressure in the well.

Since the means 17 is provided according to the property of the well that is desired to be recorded or determined, said means may be in the form of a bi-metallic element that responds to temperature changes in the well by a mechanical deformation resulting in movement by connecting such an element to shaft 25. Said shaft may respond by rotating according to the degree of deformation of the element. Thus, regardless what form the described transducer takes, or to what property of the well it responds, the same, by means of shaft 24, mechanically sets the generator 18.

In Fig. 3, the transducer is shown at 22 and the shaft it controls at 25. The generator 18 is shown as a synchro-generator that is connected to the motor 19, shown as a synchro-motor. In the synchro-generator the shaft 25 mounts rotor coils 26 that move relative to a stator coil 27 which is connected by conductors 28 to a source of alternating current, as shown. The energy induced in rotor coils 26 varies according to the rotational position of said coils relative to the stator coil. Accordingly, the signal produced in the coils 26 is transmitted by conductors 29 to similar coils 30 comprising the rotor of the synchro-motor 19. The stator coil 31 of motor 19 is also connected to the current source and having the same energization as coil 27, causes a relative position of coils 30 that is the same as the relative position of coils 26 to coil 30 and produces balance between the synchro-generator and the synchro-motor. The shaft 32 of the synchro-motor 19 carries an indicator 33 which also represents recording means, the same assuming a position corresponding to that of the transducer.

The modification of Fig. 4 has a synchro-generator 18 and a synchro-motor 19, as before, and further includes means 34 to amplify the signal produced by coil 27 of the synchro-generator. An amplifier 35 of the means 34 is used to operate a reversing motor 36 that has a mechanical connection 37 to the synchro-motor 19. This connection may be direct but, in practice, may be geared at a low ratio. When the synchro-generator and synchro-motor are in corresponding positions, the output of stator coil 27 is zero. Thus, the motor 36 has no input potential. Therefore, both the motor 36 and the synchro-motor 19 stop to maintain the balance of the circuit. The indicator or recorder 33 is as before. Since the conductors 28 and 29 are of great length, the arrangement of Fig. 4 permits transmission of relatively weak signals over great distances.

In the modification of Fig. 5, the current of source 38 is impressed on the parallel-connected potentiometers R1 and R2, the transducer 22, through connection 25a, setting arm 39 on potentiometer R2 according to a physical property present in the well. Potentiometer R1 has a similar arm 40 and amplifying means 41 interconnects said arms 39 and 40 so that the signal therebetween is increased by an amplifier 42 in the means 41 and operates a reversing motor 43 that is coupled mechanically, as at 44, with arm 40.

With arms 39 and 40 in such position that $xR1:R1=yR2:R2$, the system is in balance, i.e., $x=y$. When the value of $y$ is changed by actuation of arm 39, the system is thrown out of balance and the resulting signal or potential between the two arms 39 and 40 is amplified by the means 41 to cause the reversing motor to be driven in a direction that moves arm 40 to system-restoring direction. The position of arm 40 can be translated to provide an indication or produce a record of the value or magnitude of the pressure, temperature, etc. of the well.

The system of Fig. 5 is shown in modified form in Fig. 6 wherein direct measuring of the signal produced is shown as on a meter 45. In other words, the system is not balanced but the state of imbalance is shown by meter 45. The other described systems may be modified in the same or a similar manner.

The foregoing discloses a transducer having a single element 22 that is formed to respond to one property of a well or reservoir. Reference is now made to Fig. 7 in which is shown a transducer 16a that has a Selsyn motor 18a comparable to the motor 18 and is provided with pressure-responsive means 17a to effect a corresponding change of position of the rotor 50 of motor 18a, and with a temperature-responsive means 51 to effect a corresponding change of position of the housing (usually the stator) 52 of said motor 18a.

The pressure-responsive means 17a may comprise a helically-wound Bourdon tube 22a similar to the tube shown in Fig. 2, except that its end 23a is open to the outside of the housing or casing 20a. In such case, the apertures 21 of Fig. 2 may be omitted, since the tube 22a will be affected by pressure as before indicated, and will cause a corresponding change in the shaft 50 of the motor 18a.

In the modification of Fig. 7, the housing 20a is provided with a fixed axle or trunnion 53 that is axially aligned with the motor shafts 50. The means 51 may comprise any suitable temperature-compensating member having one end connected to axle 53 and the other to the housing 52 of the motor. As shown, member 51 may comprise a helically-wound and end-sealed Bourdon tube similar to tube 22 or a helically-wound or spirally-wound spring of temperature-expanding properties and having high coefficient of expansion.

As shown in Fig. 8, the temperature-compensating means 51 may comprise a bi-metallic element 54 that is connected at one end to the fixed axle 53 and flexes or straightens according to temperature changes and, because the other end of element 54 is connected to housing 52, causes a corresponding angular change of the position of said housing 52 in the same way that is caused by the tube or spring 51 of Fig. 7.

Since the operation of a Selsyn motor is the same whether the housing or the rotor is rotationally adjusted, the change in signal is a function of the relative positions of said rotor and housing and the two means 17a and 51a combine to compensate for various properties, such as temperature effects in the measurement of pressure.

While the foregoing has illustrated and described what are now contemplated to be the best modes of carrying out the invention, the constructions are, of course, subject to modification without departing from the spirit and scope of the invention. It is, therefore, not desired to restrict the invention to the particular form of construction illustrated and described, but to cover all modifications that may fall within the scope of the appended claims.

Having thus described our invention, what we claim and desire to secure by Letters Patent is:

1. In a well-property measuring device, a transducer adapted to be disposed in the production part of a well for producing an electric signal corresponding to at least the pressure and temperature properties of the well, said device comprising, an outer housing provided with an inner fixed axle, a Selsyn motor within said outer housing and comprising a motor housing rotationally engaged with said axle and a rotor on an axis aligned with said axle, a hollow pressure-responsive element, a hollow temperature-responsive element, one of said elements operatively connecting the outer housing and its fixed axle with the motor housing, and the other of said elements operatively connecting said outer housing and the rotor of the motor, the hollow of the latter element receiving the pressure in the well and expanding and contracting according to the difference between said well pressure and the pressure within the outer housing to, thereby, cause relative rotational movement of the outer housing and the part of the motor to which said latter element is connected, and the former element enclosing in its hollow a temperature sensitive gas that expands and contracts to correspondingly expand and contract said other element accordingly to cause relative rotational movement of the outer housing and the part of the motor to which said other element is connected.

2. In a measuring device according to claim 1, each said element comprising a Bourdon tube in spiral conformation between the ends thereof, the temperature-responsive element encircling the fixed axle and the other tube similarly encircling an extension of the axis of the motor.

3. In a well-property measuring device, a transducer adapted to be disposed in the production part of a well for producing an electric signal corresponding to at least the pressure and temperature properties of the well, said device comprising an outer housing provided with an inner fixed axle, a Selsyn motor within said outer housing and comprising a motor housing rotationally engaged with said axle and a rotor on an axis aligned with said axle, a hollow pressure-responsive element, comprising a Bourdon tube coiled around an extension of the axis of the rotor and having ends connecting the outer housing and the rotor of the motor, said tube having an open end and receiving in its hollow through said open end the pressure in the well and expanding and contracting according to the difference between the well pressure and the pressure in the housing to, thereby, cause relative rotational movement of the outer housing and the part of the motor to which said tube is connected, and a temperature-responsive coiled spring member around the fixed axle and having a high coefficient of expansion, said latter member having one end connected to said fixed axle and the other end connected to the motor housing and expanding and retracting according to changes of temperature in the fixed outer housing and, thereby, causing corresponding movement of the motor housing relative to the fixed housing.

4. In a well-property measuring device, a transducer adapted to be disposed in the production part of a well for producing an electric signal corresponding to at least the pressure and temperature properties of the well, said device comprising, an outer housing provided with an inner fixed axle, a Selsyn motor within said outer housing and comprising a motor housing rotationally engaged with said axle and a rotor on an axis aligned with said axle, a hollow pressure-responsive element, comprising a Bourdon tube coiled around an extension of the axis of the rotor and having ends connecting the outer housing and the rotor of the motor, said tube having an open end and receiving in its hollow through said open end the pressure in the well and expanding and contracting according to the difference between the well pressure and the pressure in the housing to, thereby, cause relative rotational movement of the outer housing and the part of the motor to which said tube is connected, and a temperature-responsive element comprising an elongated bimetallic member having one end connected to the fixed axle and the other end connected to the motor housing and flexing according to changes in temperature in the fixed outer housing and, thereby, causing corresponding movement of the motor housing relative to the fixed housing.

References Cited in the file of this patent

UNITED STATES PATENTS

| | | |
|---|---|---|
| 1,404,771 | Hopkins | Jan. 31, 1922 |
| 1,685,457 | Lamb | Sept. 25, 1928 |
| 2,190,260 | Ennis | Feb. 13, 1940 |
| 2,333,164 | Fisher | Nov. 2, 1943 |
| 2,360,742 | Toth et al. | Oct. 17, 1944 |
| 2,398,562 | Russell | Aug. 16, 1946 |
| 2,551,793 | De Giers et al. | May 8, 1951 |
| 2,704,353 | Alkan | Mar. 15, 1955 |
| 2,739,306 | Waite et al. | Mar. 20, 1956 |
| 2,750,796 | Knoll et al. | June 19, 1956 |

FOREIGN PATENTS

| | | |
|---|---|---|
| 2,383 | Great Britain | 1863 |
| 120,440 | Great Britain | Nov. 11, 1918 |